D. GOLDBERG.
MEANS FOR REMOVING FIRE HYDRANT VALVES WHILE UNDER WATER PRESSURE.
APPLICATION FILED DEC. 20, 1915.
1,349,062.
Patented Aug. 10, 1920
4 SHEETS—SHEET 4.
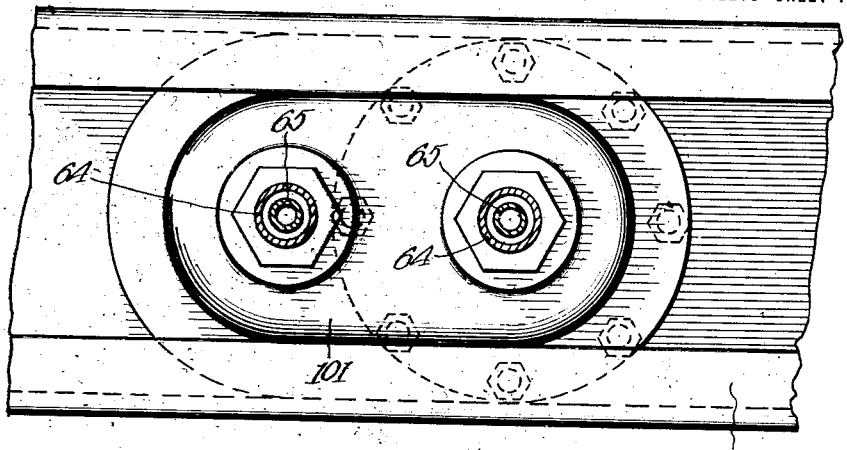
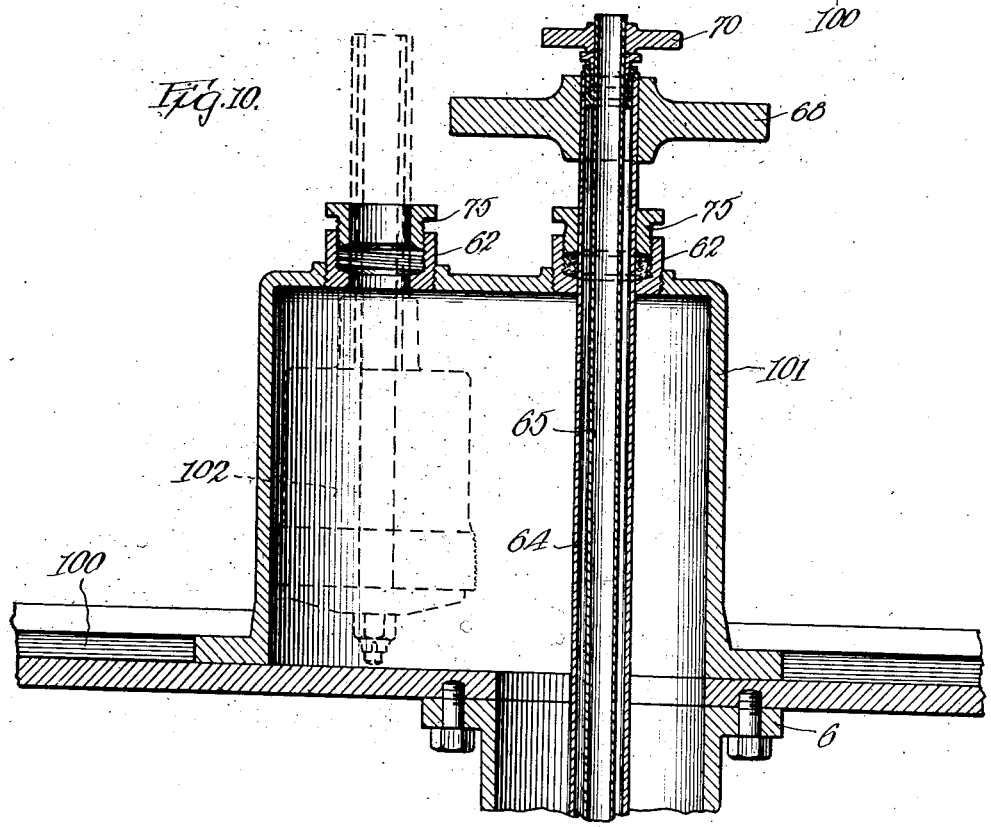

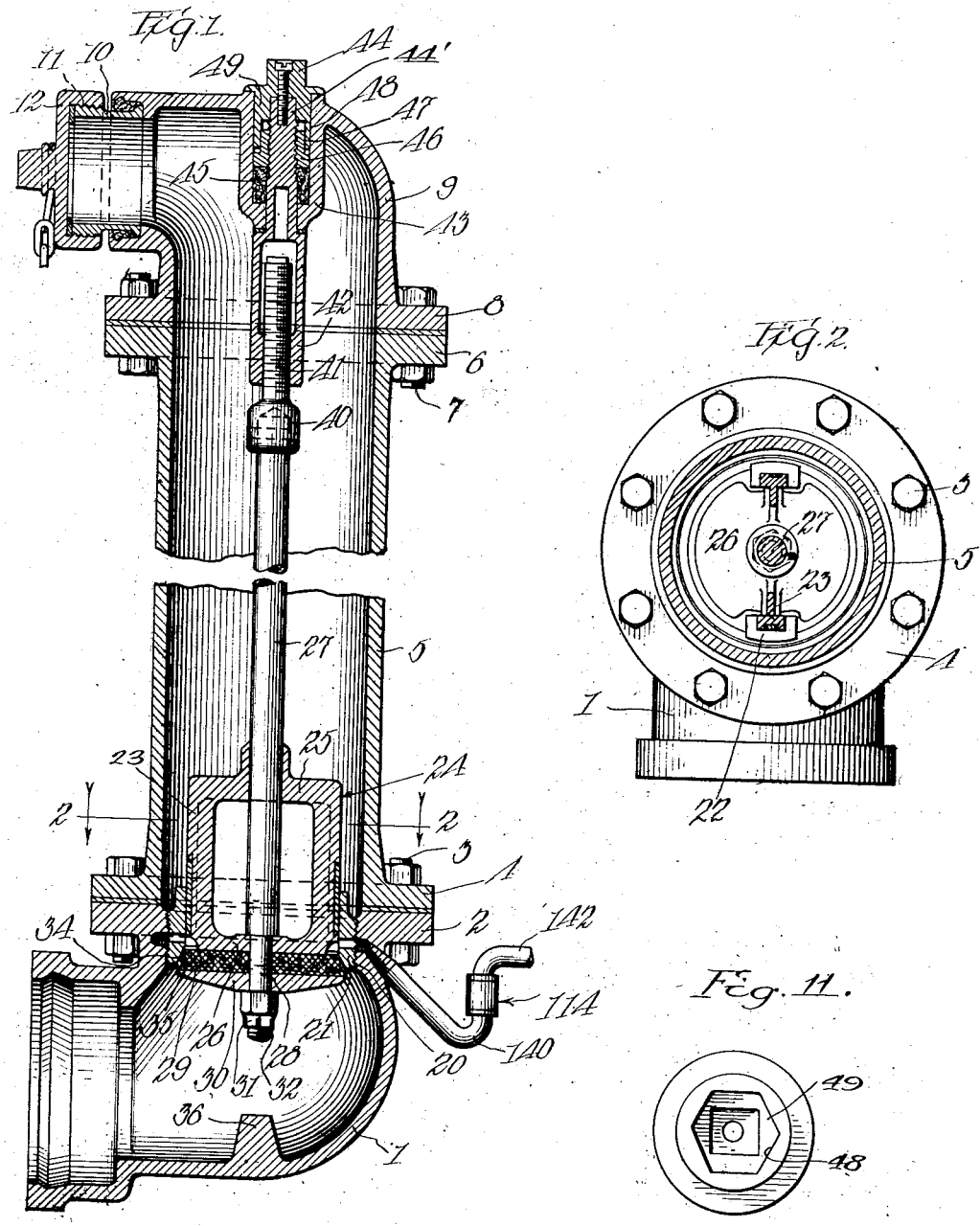

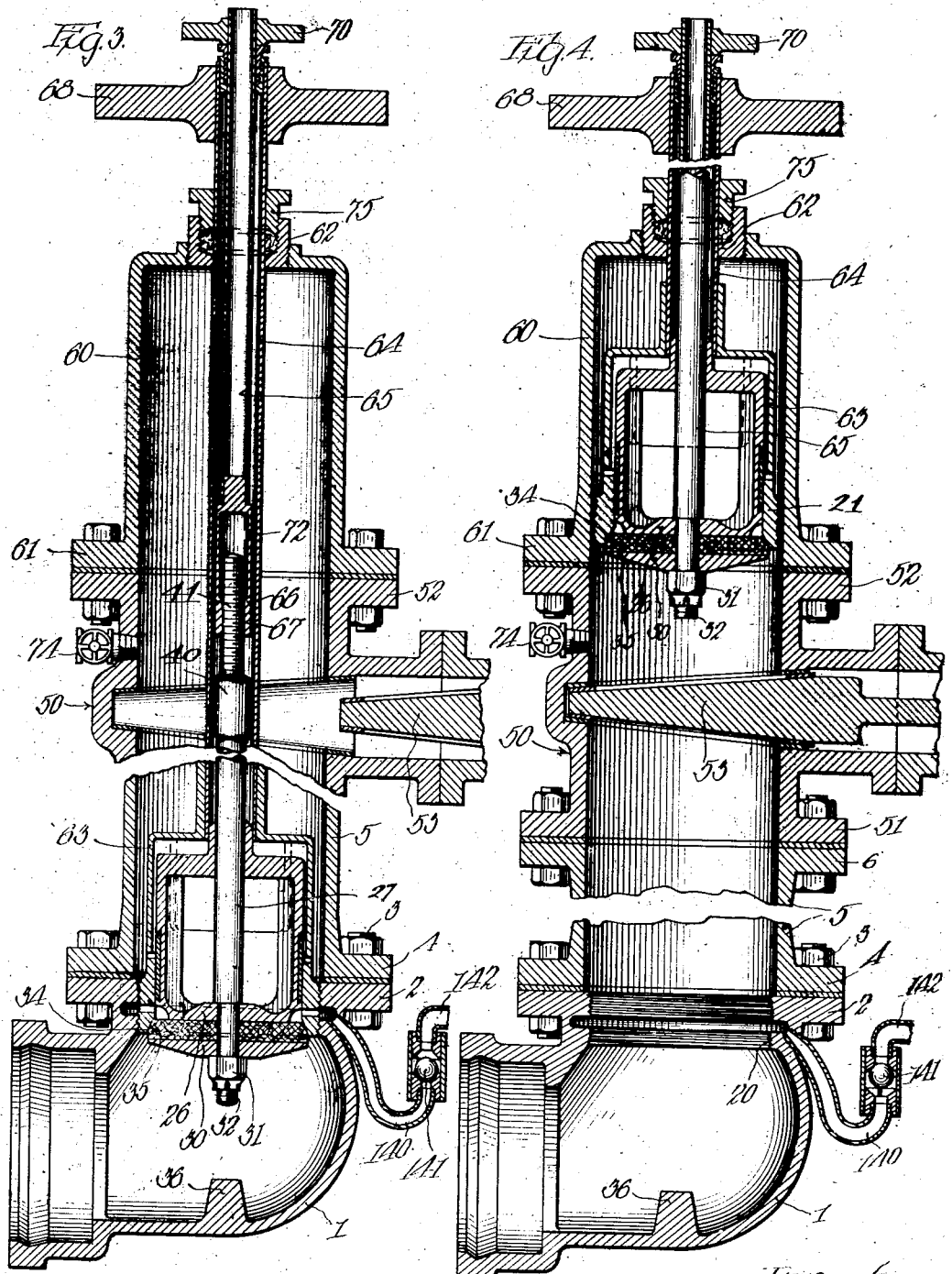

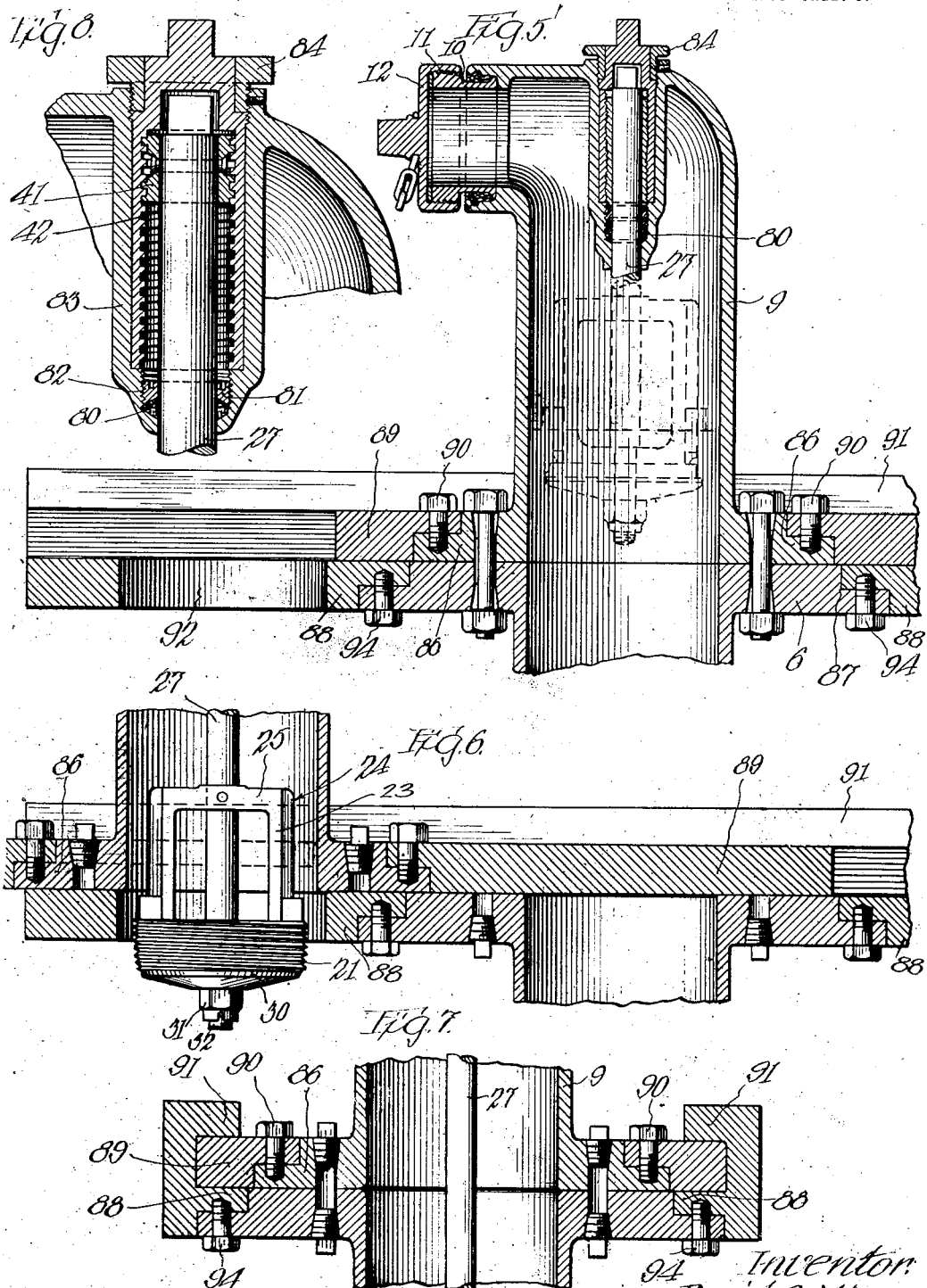

UNITED STATES PATENT OFFICE.

DAVID GOLDBERG, OF CHICAGO, ILLINOIS.

MEANS FOR REMOVING FIRE-HYDRANT VALVES WHILE UNDER WATER-PRESSURE.

1,349,062.   Specification of Letters Patent.   Patented Aug. 10, 1920.

Application filed December 20, 1915. Serial No. 67,841.

*To all whom it may concern:*

Be it known that I, DAVID GOLDBERG, a citizen of the United States, residing at Chicago, county of Cook, and State of Illinois, have invented Means for Removing Fire-Hydrant Valves While Under Water-Pressure, of which the following is a full, clear, and exact description.

My invention is an improvement in the process of removing a fire hydrant valve, or any part thereof, and the replacing of the valve, or a portion thereof. At present in the various cities, for instance, Chicago, the method used consists in the shutting down of a whole section of the water system in a particular portion of the city, the draining of the pipe section shut down, the digging up of the hydrant, the removing of the unsatisfactory part, the replacing thereof by another valve or valve portion, the putting on of the upper portion of the fire hydrant, and then the turning on of the water. In order to cause as little inconvenience as possible during the fixing of the fire hydrant men are ordinarily sent to notify the whole neighborhood that the water supply will be shut off, which occupies about a day. The work itself occupies about another day, and the result is that the neighborhood is without water about two days. The incurred expense and inconvenience is so great that a fire hydrant valve is allowed to leak pretty badly before it is considered worth while to attempt to repair it. This results in a large loss of water throughout the city, requiring the consumption of extra fuel to supply the city with the desired amount of water.

In my process it is not necessary to shut off the water at all, therefore, no men need be sent around to notify the neighborhood; and, moreover, by actual timing I have found that a very leaky valve has been removed from the hydrant and replaced by another and the hydrant again completely put into condition in about one-half an hour. The inconvenience to the neighborhood is therefore *nil* and the cost of repairing a leaky fire hydrant tremendously reduced, making it worth while to stop the leaks as soon as discovered.

My invention is illustrated by the accompanying drawings, of which Figure 1 shows a cross-section through a fire hydrant of the preferred form; Fig. 2 a cross-section of the valve portion thereof taken along the lines 2—2 of Fig. 1; Fig. 3 shows the hydrant and the apparatus that I apply thereto in their positions before the valve has been removed from its seat; Fig. 4 shows the same parts as Fig. 3 but in their positions after the valve has been removed from its seat. Figs. 5, 6, 7 and 8 show another construction of the hydrant and of the apparatus permitting the valve to be removed while under water pressure. Fig. 5 shows a sectional elevation of the above fire hydrant with the apparatus applied thereto; Fig. 6 shows the same parts as Fig. 5 but in different positions; Fig. 7 is a view of the same parts as in Fig. 5 but the section of elevation is at right angles to that of Fig. 5; Fig. 8 shows on a larger scale the nut illustrated in Fig. 5. Figs. 9 and 10 show still another modification of the construction of the fire hydrant and the apparatus used in removing a valve while under pressure; Fig. 9 shows a plan view and Fig. 10 a sectional elevation. Fig. 11 shows on an enlarged scale a bottom plan of the wrench piece to be later described.

I shall now describe the hydrant illustrated in Figs. 1, 2 and 11, which represents my preferred form. The hydrant is provided with a bottom elbow 1, which is fastened in any suitable manner, as by bolting or calking to the pipe system. This bottom elbow has an upper flange 2, provided with a number of holes for bolts 3, which pass also through holes in the lower flange 4 of the middle portion 5 of the hydrant. This intermediate portion 5 is a plain cylindrical pipe provided at its lower end with a flange 4, already referred to, and at its upper end with a similar flange 6. Passing through holes in flange 6 are a number of bolts 7 whereby there is fastened to said flange the flange 8 of the upper portion of the fire hydrant 9. This upper portion or top is provided with one or more nozzles 10. In the preferred form there are two such nozzles, but of course the number is a matter of choice. Each one of these nozzles 10 is provided with a threaded pipe 11, which is leaded in and which serves to hold the cap 12, which is screwed thereon. Between the flanges 2 and 4 is placed a gasket to make the joint water tight and a similar gasket is placed between the flanges 6 and 8.

The valve portion of the hydrant will now be described. The lower elbow 1 of the hydrant is provided with a threaded portion 20 rigid therewith, ordinarily threaded taper; screwed into the taper seat 20 is a bronze seat 21 forming a portion of the valve body. The bronze seat is ordinarily screwed in by means of a big wrench until it is seated tightly in the taper thread 20, and for further purposes may be considered rigid with the hydrant bottom. This bronze framing 21 has rising therefrom guides 22 rigid therewith, wherein there move the slides 23 of the movable portion of the valve 24. These slides 23 are united by an upper bridge piece 25 and a lower disk 26. A rod 27 passes through a hole in the bridge piece 25 and a reduced portion 28 of said rod passes through a hole in the disk 26. Placed on the rod below the disk are a rubber piece 29, a cast iron disk 30 and a nut 31. This nut when tightened up on screw 32 of rod 28 tightens the movable portion of the valve, the rod, the rubber and the cast iron disk together.

The bronze seat 21 is formed into an internal cone 34, which is adapted to be closed by an external cone 35 formed upon the rubber 29, thereby shutting the valve. The elbow 1 is provided with the cast iron boss 36 to prevent the valve rod 27 from dropping down too far.

The rod 27 is made of suitable length and at its upper portion there is riveted thereto a bronze rod 40, provided with external threads 41. These threads form a screw which is surrounded by a nut 42. It has been stated before that the bronze seat 21 is screwed in by main force into the cast iron seat 20 until it is firmly seated, and during ordinary operations remains rigid. The movable portion of the valve is therefore prevented by its guides 24 from having any but an up and down movement. The rotation of the nut 42 in the top therefore results in giving to said rod an up and down movement only, thus opening or closing the valve. The nut 42 itself is mounted in an internal boss 43 forming a part of the upper portion or bonnet 9 of the hydrant. In order to open and close the hydrant all that is necessary is to turn 42 in its bearing, and for this purpose it has fastened thereto at its upper end a square wrench portion 44 whereon can be placed the wrench for opening the fire hydrant. This square portion 44 embraces a square portion 44' forming a part of the nut 42. In order to prevent the water in the inside of the hydrant from leaking through the bearing holding the nut 42 there is introduced between the nut and the internal boss 43 some packing 45, which is compressed by collar 46 threaded upon 42. This collar 46 is prevented from unscrewing itself by having its external surface 47 formed into a male hexagon, which is embraced by a female hexagon 48, forming the internal surface of a collar 49, which is one piece with the wrench piece 44.

The above described hydrant has only one valve. In case the hydrant is provided with more than one nozzle then it is necessary that either they all be used simultaneously whenever the hydrant is opened or else those nozzles which are not being used shall have their caps 12 upon them. No attention is paid to any water that might leak through a nozzle and its cap as that is but little at any time and occurs only while the fire hydrant is in use. If so desired the small leakage could be prevented by placing a rubber gasket inside the cap.

I shall now describe my process and apparatus whereby I am enabled to remove a defective valve from its seat and to replace it by another without shutting off the water from the hydrant. This is particularly illustrated in Figs. 3 and 4.

First, the top portion 9 of the fire hydrant is unfastened from the intermediate portion 5, by having the bolts 7 unscrewed and removed. A wrench is then applied to the wrench piece 44 and said piece is turned. The nut 42 is thus turned upon the rod 41 and the whole top is lifted in the air. As a matter of practice, it is found that the water pressure at the bottom of the valve is sufficient to keep said valve closed with a force sufficient to resist the weight of the top piece 9. During the turning of the wrench piece 43 the top is prevented by hand from turning around therewith. When the nut 42 has become completely unscrewed from the rod 41 the upper portion 9 is removed. There is now placed in its stead upon the flange 6 a gate valve 50, provided with a lower flange 51 and an upper flange 52 and a gate 53. The gate valve is of ordinary construction and therefore will not be further described. During the placing of the gate valve upon the flange 6 the gate is open to allow room for the rod 41. There is then fastened to the upper flange 52 of the gate valve a special bonnet 60, provided with a flange 61 and a stuffing box 62. Passing through the stuffing box 62 is a long tube 64 which has fastened to its bottom a wrench 63. Mounted inside of the tube 64 is another tube 65, provided at its lower end with a nut 66, which is provided with internal threads 67, capable of being screwed upon the rod 41, forming the upper portion of the valve rod. When the auxiliary bonnet 60 is fastened to the top of the gate valve the wrench tube 64 is in its elevated position. The wrench tube 64 is provided on the outside of the stuffing box with two handles 68, whereby it may be lifted and turned. The tube 65 also is provided with two handles 70, whereby it may be lifted and turned. When the bonnet 60 has been bolted to the gate valve 50 the wrench tube 64 is pushed down through the gate valve until the wrench 63 surrounds and grips the bronze seat 21 of the hydrant valve. The tube 65 is then pushed down and turned by means of its handles 70 until its nut 67 is screwed upon the rod 41. A hole 72 is left in the nut 67 to allow exit for the entrapped water. When both the wrench tube and the rod tube are properly in their places the wrench handles 68 are by main force turned in a direction to unscrew the bronze valve from its seat in the lower elbow. When said valve seat is completely unscrewed all the parts are raised together by means of the wrench tubes 64 and 65. The wrench and bronze hydrant valve are thus lifted up completely through the intermediate hydrant piece 5 and gate valve 50 into the upper bonnet 60. Thereupon the gate 53 of the gate valve is shut tight, preventing the flow of water. The apparatus is now in condition to have the bonnet 60 unbolted from the gate valve and opened to inspection, so that the bronze valve may be either replaced or fixed.

It has been thought desirable to add a small cock 74 to the gate valve, whereby the water may be drained out of the bonnet after the gate valve has been shut, in order that when the bonnet is unbolted there shall be no splashing of water.

It is found in actual practice that the pressure of the water in the hydrant tends to lift the bronze valve and pipe wrench with a force more than sufficient to support them in an elevated position. In case the pressure of the water is not strong enough for said purpose, they are lifted by main force by the pipe wrench 65. When raised as far as desired it can be tightened in its elevated position by screwing the stuffing box tighter by means of the collar 75.

When the old valve has been fixed or a new valve has been substituted therefor, the process for replacing the new valve is the reverse of the process of removing the old one. First, the bonnet, with a new valve therein in an elevated position, is fastened to the top of the gate valve; second, the small valve 74 is shut tight; then the gate valve is opened and the water allowed to fill the bonnet. Then the pipe wrench, with the bronze valve, is pushed down, the stuffing box 75 being properly loosened. Then the pipe wrench is turned by means of the handles 68 until the bronze valve is tightly screwed into the seat in the lower elbow 1. The handles 70 of the valve rod nut are then turned, unscrewing the nut from the valve rod. The nut and wrench are now free to be removed from the valve body and valve rod. This is done by lifting the pipe wrench 64 in the stuffing box. It is found in practice that the water pressure automatically shuts the bronze valve as it is screwed down in the lower elbow. The lifting of the pipe wrench into the bonnet leaves the bronze valve closed, either completely or almost completely, shutting off the water. The bonnet 60 and valve 50, either separately or together, are then unbolted from the upper flange 6 of the intermediate hydrant portion 5 and removed. The ordinary top piece 9, which had previously been removed, is now replaced upon the hydrant, the workmen being careful to screw the nut 42 upon the valve rod 41 while placing said top piece on the hydrant. The hydrant top 9 is then bolted to the flange 6 and the fire hydrant is again in condition to be used.

I wish to call attention here to some of the steps necessary in my process of removing a valve or any portion thereof. (1) It is necessary to supply the hydrant pipe with an auxiliary valve placed further from the water supply than the original valve to be removed; (2) to supply a wrench working through a stuffing box and adapted to unscrew the valve or the part of the valve that it is desired to remove from its seat; (3) to unfasten the part that it is desired to remove from its seat by means of said wrench working through said stuffing box; (4) to remove said valve or part of valve from its seat into another location on the other side of the auxiliary valve, previously mentioned; (5) to close said auxiliary; (6) to open the apparatus to the air to thus gain access to the defective part.

Figs. 1, 3 and 4 show a small check valve 114, placed at the right hand of the bottom elbow, Fig. 1 showing the outside appearance thereof and Figs. 3 and 4 showing the internal construction. It consists of a pipe 140, provided with a ball 141 and an exit tube 142. The pipe 140 is open to the space inside the pipe 5. This is a drain for said space. It is well known that it is highly desirable that there be no water in the main hydrant behind the valve. Should there be any water in said pipe in winter time it is quite likely to freeze and break the hydrant. In Fig. 3 the drain 140 is shown with the ball 141 in its lower position. The exit 142 is therefore open because the weight of the ball 141 is made great enough to overcome the head of the water within the cylindrical pipe 5, and this is the only head of water when the bronze valve is closed. But when the valve is removed from its seat, as in Fig. 4, there is brought against the ball 141 the full water pressure of the system, which thereupon overcomes the weight of the ball and lifting it, closes the exit 142, so that during the removing of a defective valve and the replacing thereof by one in good condition there is no constant flow of water through said drain.

I shall now describe some modifications of the construction of the hydrant and valve changing apparatus that I have thought of. Now I shall describe the construction illustrated in Figs. 5, 6, 7 and 8. The bottom elbow and intermediate pipe piece of the hydrant are of the same construction as illustrated in Figs. 1 and 2. The top casing has, however, been modified, as clearly shown in Fig. 5. The modification consists in the fact that the internal boss projecting inward from the casing has been so made that the valve rod 27 can be readily lifted out therethrough. The valve rod 27 is provided with a packing 80, kept in place by a collar 81, threaded into the nut 82, which is a portion of the internal boss 83. The upper portion of the rod 27 has riveted thereto a screw 41, which is embraced by a nut 42. This nut is held in place in the internal boss by a threaded collar 84, but the sizes are all so proportioned, as illustrated in Fig. 8, that each part is smaller than the opening above it, so that they may all be lifted out of the internal boss 83 without encountering interference. The outside of the bonnet 9 is turned down to a ring shoulder 86. The flange 6 also has ring shoulder 87 turned thereon. Whenever it is desired to obtain access to the valve of the fire hydrant an auxiliary apparatus, consisting of two plates 88 and 89, are placed upon the lower flange ring shoulder 87 and the upper casing ring shoulder 86. The upper bonnet is then fastened to the plate 89 by means of screws 90, and the lower plate 88 is fastened to the flange 6 by means of screws 94. The bolts 7 which normally hold the upper casing to the middle pipe piece are then removed and the holes temporarily plugged by means of studs. Figs. 6 and 7 show two other views of the plates 88 and 89. The figures show that the upper plate 89 is made to slide upon the plate 88 and prevented from any other movement by means of guides 91.

When it is desired to remove a valve from its seat the threaded collar 84 and the nut 42 are unscrewed and removed, leaving the screw 41 accessible; a wrench is then applied to the upper portion of the screw 41 and turned by main force. It will, therefore, unscrew the bronze valve from its seat, whereupon the rod 27 and the valve may be lifted. It is so lifted until the valve is raised into the casing 9, as illustrated in Fig. 5. The plate 89 is thereupon pushed in its guides 91—88 until it completely covers the opening of the pipe 5, thus shutting off the water. At the same time the somewhat further movement brings the opening of the casing 9 over another hole 92 of the plate 88, whereupon the water in the upper casing drains out and the valve becomes accessible for fixing or replacing. The parts are then as shown in Fig. 7.

Attention is called to the fact that in the process and apparatus just described there is also present a long wrench, working through a stuffing box. In this case the wrench is permanently supplied and is the valve rod itself instead of being a special pipe wrench, as in the hydrant of the first description. Nevertheless, the valve rod is ordinarily not used as a wrench and this is a new function given to it whereby it is used to unscrew the valve from its seat and, therefore, can be called a valve wrench. Again, the two plates 88 and 89, sliding on each other, really are nothing but a valve taking the place of the gate valve previously described; and, moreover, this new form of valve is placed farther from the main supply of water than the bronze valve which is to be removed and is shut before access is gained to the removed valve.

In Figs. 9 and 10 is shown still another modification of the process and apparatus for removing a valve from a fire hydrant while under water pressure. The construction of the fire hydrant here is the same as that illustrated in Figs. 1 and 2; the auxiliary apparatus is different. After the upper casing 9 has been removed the procedure being similar to that first described, there is screwed upon the pipe flange 6 an apparatus consisting of a slide-way 100, wherein is slidably mounted a bonnet 101. This bonnet is supplied with two stuffing boxes, the parts whereof are similarly numbered as the stuffing boxes of Figs. 3 and 4. Through each stuffing box extends a pipe wrench 64 and a valve-stem wrench 65. As the apparatus now has two such pipe wrenches it is possible to load this apparatus with a new valve 102 before applying it to the hydrant. When the defective valve has been unscrewed from its seat by the non-loaded pipe wrench and lifted up into the auxiliary casing 101 said casing is moved over in its guide-ways 100, bringing the new valve 102 opposite the pipe 5, whereupon it is pushed down and screwed into its seat in the bottom elbow. The fire hydrant thus again becomes water tight and the auxiliary apparatus is now unbolted and removed.

Attention is here again called to the resemblance to the apparatus and process first described. Some points of similarity are: (1) The provision of a means for screwing a valve into its seat, said means working through a stuffing box, and this means I shall call a wrench; (2) the providing of an auxiliary valve located farther from the water supply than the valve to be removed, in this case it is the new valve 102; (3) the releasing of the defective valve from its seat and the bringing it to the other side of the auxiliary valve, in this case it is done by lifting the defective valve up into the casing, by moving the whole casing and by screwing the new valve into place, thus bringing the old valve to the other side of the new valve; and (4) opening of the apparatus to the air, thus gaining access to the old valve. This similarity of the new process and apparatus to the process and apparatus in connection with Figs. 1, 3 and 4 becomes very striking when it is considered that the new valve 102 is nothing but a new form taking the place of the gate valve 50. It so happens in this case that the old defective hydrant valve and the new valve are made equal and can, therefore, replace each other.

In the preceding I have described the preferred form of the process for removing a valve from a fire hydrant while said fire hydrant and valve remain under water pressure. I wish to call attention to some modifications that might be made in the process without departing from the spirit thereof.

It has been said that the fire hydrant is supplied with an auxiliary valve and with a wrench working through a stuffing box. It is obvious that it makes no difference whether the auxiliary valve is supplied first and the stuffing box and wrench later, or whether the wrench and stuffing box are supplied first and the auxiliary valve later, or whether both are supplied simultaneously. What is needed is that they all be present before the defective valve is removed. Again, it is not necessary that the stuffing box be used only for permitting the valve wrench to work therethrough to unfasten the valve from its seat; it might at other times be used for other purposes, and it is so used in the form illustrated in Figs. 5, 6, 7 and 8. Again, the wrench itself need not always be used as a wrench but might at other times be used for other purposes; for instance, as valve stem, and is so used in the form just mentioned. There may be more than one stuffing box instead of only one; in the form illustrated in Figs. 9 and 10 there are two stuffing boxes; in the form illustrated in Figs. 1, 3 and 4 there are really two stuffing boxes, one in the bonnet and another in the top of the wrench tube 64. Again, the auxiliary apparatus might be attachable, which it is in the forms shown in the figures, or might be left as a permanent feature of the hydrant, which could easily be done in the form shown in Figs. 5, 6, 7 and 8; this might, of course, involve some slight changes in construction. Again, in the preferred form the valve is unfastened from its seat by means of a special wrench and lifted by means of the valve stem; in Figs. 5, 6, 7 and 8 the valve is both unscrewed from its seat and lifted by means of the valve stem.

I have stated in various places in the above description that an auxiliary valve is supplied. By a valve I mean an apparatus for shutting off water, no matter what the shape of the apparatus is. In Figs. 3 and 4 the auxiliary valve is the ordinary gate valve. In Figs. 5, 6, 7 and 8 the valve is composed of the two sliding plates 88 and 89, which, sliding upon each other, shut off the water from the hydrant middle pipe 5. In Figs. 9 and 10 the auxiliary or new valve may be considered as the stored hydrant valve.

I have described the preferred form of my process, but it is possible to use only certain steps of my process and take advantage of them without using the whole process as I prefer it. For instance, in the form illustrated in Figs. 1, 3 and 4 the tube of the valve wrench 64 might be made of a diameter larger than the diameter of the hydrant valve; the stuffing box for said tube and bonnet would be correspondingly increased in dimensions. Assume that there are two such valve wrenches, in one of which there is stored a new valve to take the place of the valve which is to be removed. The process might now be as follows: First, the old hydrant top is removed; second, the bonnet is applied, either with or without the wrench therein, if the latter, the wrench is now pushed through the stuffing box in the bonnet; the wrench is now pushed down and the valve unscrewed from its seat and lifted up to almost be removed from the bonnet; the other wrench is now held ready and by dexterous manipulation the first wrench is quickly removed from the bonnet and the second one forced in to replace it; the second wrench is now pushed down and used to fasten the new valve in its seat. The above process thus permits the removing of a valve from a fire hydrant and the replacing thereof while opening said fire hydrant for a minimum length of time, which might be considered desirable, although it is not my preferred form.

I am well aware that hydrants have been built which have auxiliary valves, but as far as I know these auxiliary valves were always nearer to the water supply than the valve which was to be removed. In my invention the auxiliary valve is located farther from the water supply than the valve to be removed.

In the description given above I have shown and illustrated not only a process for removing a fire hydrant while under water pressure but have also shown and illustrated apparatuses, hydrants and other features. The hydrants themselves are novel and also the apparatuses. In this application for patent I wish to limit my claims to the process of removing the valve.

Having thus described my invention, I claim:

1. In combination with a high pressure hydrant including a valve casing, a valve seat in said casing and threaded therinto, a valve, and a standpipe attached to said casing, an auxiliary valve adapted to be secured to the upper end of said standpipe, and means for engaging said valve whereby said valve seat and said valve may be withdrawn above said auxiliary valve.

2. For use with a high pressure hydrant including a valve casing, a valve seat in said casing and threaded thereonto, a valve, a standpipe, and a sectional valve spindle, an upper casing, an auxiliary valve adapted to be interposed between said upper casing and said standpipe, means for disengaging said valve seat from said valve casing, and means engaging said valve spindle for withdrawing said valve and valve seat above said auxiliary valve.

3. For use with a high pressure hydrant, including a valve casing, a valve seat in said casing and threaded thereonto, a valve, a standpipe, and a sectional valve spindle, an upper casing, an auxiliary valve interposed between said casing and said standpipe subsequent to removal of the upper valve spindle section, means extending through said standpipe and in engagement with said valve seat for disengaging the latter from said valve casing, and means for withdrawing said valve and valve seat above said auxiliary valve, said first and second named means being manually operated independently of each other.

4. For use with a high pressure hydrant including a valve casing, a valve seat in said casing and threaded thereonto, said valve seat being provided with a plurality of spaced upright lugs, a valve, a sectional valve spindle and a standpipe, an upper casing, an auxiliary valve secured to said upper casing and adapted to be secured to said standpipe, means adapted to engage the lugs of said valve seat to remove the same from the valve casing, and means engaging the lower section of the said valve spindle for withdrawing the valve and seat above said auxiliary valve, substantially as described.

5. For use with a high pressure hydrant including a valve casing, a valve seat in said casing and threaded thereonto, said valve seat being provided with a plurality of spaced upright lugs, a valve, and a standpipe, an upper casing, a gate valve secured to said upper casing and adapted to be secured to said standpipe, a tube having means for engaging said valve seat to remove the same from the valve casing, and means inserted through said tube for withdrawing the said valve and seat above said gate valve, substantially as described.

DAVID GOLDBERG.